United States Patent
Lee et al.

(10) Patent No.: US 12,125,155 B2
(45) Date of Patent: Oct. 22, 2024

(54) METHOD AND ELECTRONIC DEVICE FOR ARRANGING AR OBJECT

(71) Applicant: Samsung Electronics Co., Ltd., Suwon-si (KR)

(72) Inventors: Sanghun Lee, Suwon-si (KR); Daiwoong Choi, Suwon-si (KR); Hyunjin Kim, Suwon-si (KR); Hongil Kim, Suwon-si (KR); Byungjun Son, Suwon-si (KR); Dasom Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 144 days.

(21) Appl. No.: 17/883,222

(22) Filed: Aug. 8, 2022

(65) Prior Publication Data

US 2022/0383599 A1  Dec. 1, 2022

Related U.S. Application Data

(63) Continuation of application No. PCT/KR2021/001586, filed on Feb. 5, 2021.

(30) Foreign Application Priority Data

Feb. 10, 2020  (KR) .......... 10-2020-0015593

(51) Int. Cl.
*G06T 19/00* (2011.01)
*G06T 13/00* (2011.01)
(Continued)

(52) U.S. Cl.
CPC ............ *G06T 19/006* (2013.01); *G06T 13/00* (2013.01); *G06F 3/0487* (2013.01); *G06T 7/70* (2017.01)

(58) Field of Classification Search
CPC .......... G06T 19/006; G06T 13/00; G06T 7/70; G06F 3/0487
See application file for complete search history.

(56) References Cited

U.S. PATENT DOCUMENTS

| | | |
|---|---|---|
| 8,213,757 B2 | 7/2012 | Harrysson et al. |
| 11,403,848 B2 | 8/2022 | Choi et al. |

(Continued)

FOREIGN PATENT DOCUMENTS

| | | |
|---|---|---|
| JP | 2001-267832 | 9/2001 |
| JP | 4039666 | 1/2008 |

(Continued)

OTHER PUBLICATIONS

Baudisch, Patrick, "High-Density Cursor", Jan. 2003, https://www.researchgate.net/publication/221054320_High-Density_Cursor_A_Visualization_Technique_That_Helps_Users_Keep_Track_of_Fast-Moving_Mouse_Cursors?_tp=eyJjb25OZXh0Ijp7ImZpcnNOUGFnZSI6II9kaXJlY3QiLCJwYWdlIjoiX2RpcmVjdCJ9fQ (Year: 2003).*

(Continued)

*Primary Examiner* — Michelle L Sams
(74) *Attorney, Agent, or Firm* — Nixon & Vanderhye, P.C.

(57) ABSTRACT

An example electronic device includes a display; at least one sensor; at least one camera; and a processor operably connected to the display, the at least one sensor, and the at least one camera, wherein the processor executes an augmented reality (AR) application, obtains image data of surroundings of the electronic device by using the at least one camera, generates a 3D space coordinate system on the basis of the obtained image data, obtains a first input of selecting a 3D object, obtains a second input of selecting a first point on the display, maps the first point to a first coordinate of the 3D space coordinate system, generates a 3D path connecting the first coordinate of the 3D space (Continued)

coordinate system to a second coordinate of the 3D space coordinate system, on the basis of movement of the electronic device detected by the at least one sensor and movement of the second input on the display, and arranges the 3D object on a plurality of coordinates on the 3D path.

17 Claims, 18 Drawing Sheets

(51) Int. Cl.
*G06F 3/0487* (2013.01)
*G06T 7/70* (2017.01)

(56) References Cited

U.S. PATENT DOCUMENTS

| | | | |
|---|---|---|---|
| 2004/0080548 A1 | 4/2004 | Daily et al. | |
| 2008/0194323 A1* | 8/2008 | Merkli | A63F 13/213 463/43 |
| 2009/0284532 A1* | 11/2009 | Kerr | G06F 3/0481 345/442 |
| 2013/0182012 A1 | 7/2013 | Kim et al. | |
| 2013/0328927 A1* | 12/2013 | Mount | G06T 19/20 345/633 |
| 2014/0325443 A1 | 10/2014 | Kim et al. | |
| 2016/0005207 A1* | 1/2016 | Jeon | G06T 13/40 345/474 |
| 2018/0101986 A1 | 4/2018 | Burns et al. | |
| 2018/0300952 A1* | 10/2018 | Evans | G06F 9/453 |

FOREIGN PATENT DOCUMENTS

| | | |
|---|---|---|
| JP | 5570633 | 8/2014 |
| KR | 10-2013-0078238 | 7/2013 |
| KR | 10-2013-0083179 | 7/2013 |
| KR | 10-2014-0033868 | 3/2014 |
| KR | 10-2014-0126949 | 11/2014 |
| KR | 10-1843024 | 3/2018 |
| KR | 10-2021-0014892 | 2/2021 |

OTHER PUBLICATIONS

International Search Report for PCT/KR2021/001586 dated Jun. 1, 2021, 6 pages.
Written Opinion of the ISA for PCT/KR2021/001586 dated Jun. 1, 2021, 5 pages.

\* cited by examiner

METHOD AND ELECTRONIC DEVICE FOR ARRANGING AR OBJECT

CROSS-REFERENCE TO RELATED APPLICATIONS

This application is a continuation of International Application No. PCT/KR2021/001586 designating the United States, filed on Feb. 5, 2021, in the Korean Intellectual Property Receiving Office and claiming priority to Korean Patent Application No. 10-2020-0015593, filed on Feb. 10, 2020, in the Korean Intellectual Property Office, the disclosures of which are incorporated by reference herein in their entireties.

BACKGROUND

Field

The disclosure relates to a method and an electronic device for arranging a plurality of 3D objects in augmented reality.

Description of Related Art

With the rapid evolution of electronic devices such as communication terminals, various functions capable of providing entertainment and pleasure to users in addition to voice calls are included in the electronic devices. In relation to the various functions, photographing and editing functions of a camera also include a function of enhancing a user experience satisfaction by allowing the user to combine a desired funny element such as a sticker, a figure and text with a captured image, without being limited to just simple image capture using the camera. Such functions are not simply limited to 2D, and can introduce an augmented reality (AR) concept of inserting a 3D object into a photographed image or video.

Various technologies for increasing a user experience satisfaction in which an AR concept have been introduced and include a technology of creating content by synthesizing a screen obtained by photographing the movement of an electronic device or a drawing on a screen of the electronic device, a technology in which a user selects a position in which a specific object is to be arranged and arranges the object in the corresponding position, and the like.

SUMMARY

In conventional technology in which a user selects a position in which a specific object is to be arranged and arranges the object in the corresponding position, although an AR object could be inserted into a captured image, there was an inconvenience of, when arranging two or more objects, having to select an object and an object arrangement position every time.

Also, using conventional technology of creating content by synthesizing a screen obtained by photographing the movement of an electronic device or a drawing on a screen of the electronic device, an AR effect could be given to a captured image, but a user could easily become bored, because monotonous content was provided in that content capable of being expressed by overlapping on the captured image was limited to a line.

Embodiments of the disclosure may provide a method and an electronic device capable of arranging a plurality of AR objects in a captured image at once according to a user's intention, and also capable of arranging the AR objects intuitively and quickly.

An electronic device according to an example embodiment may comprise a display, at least one sensor, at least one camera, and a processor operably connected to the display, the at least one sensor, and the at least one camera. The processor may execute an augmented reality (AR) application, obtain image data of surroundings of the electronic device using the at least one camera, provide a 3D space coordinate system, based on the obtained image data, obtain a first input of selecting a 3D object, obtain a second input of selecting a first point on the display, map the first point to first coordinates of the 3D space coordinate system, provide a 3D path connecting from the first coordinates of the 3D space coordinate system to second coordinates of the 3D space coordinate system, based on movement of the electronic device detected by the at least one sensor and movement of the second input on the display, and arrange the 3D object at a plurality of coordinates on the 3D path.

A method of operating an electronic device according to an example embodiment may comprise executing an augmented reality (AR) application, obtaining image data of surroundings of the electronic device, providing a 3D space coordinate system, based on the obtained image data, obtaining a first input of selecting a 3D object, obtaining a second input of selecting a first point on a display, mapping the first point to first coordinates of the 3D space coordinate system, providing a 3D path connecting from the first coordinates of the 3D space coordinate system to second coordinates of the 3D space coordinate system, based on movement of the electronic device detected by the at least one sensor and movement of the second input on the display, and arranging the 3D object at the plurality of coordinates on the 3D path.

According to various example embodiments, an electronic device may provide and arrange a plurality of 3D objects in a virtual space and photograph an AR-based photo and video. Also, the electronic device may arrange the plurality of 3D objects intuitively, quickly and easily, and may arrange the plurality of 3D objects at once according to a user's intention.

According to various example embodiments, the electronic device may provide a user with a photo and video photographing service that is based on more diverse contents.

Effects obtainable based on various embodiments are not limited to the effects mentioned above, and other effects not mentioned can be clearly understood from the description below.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
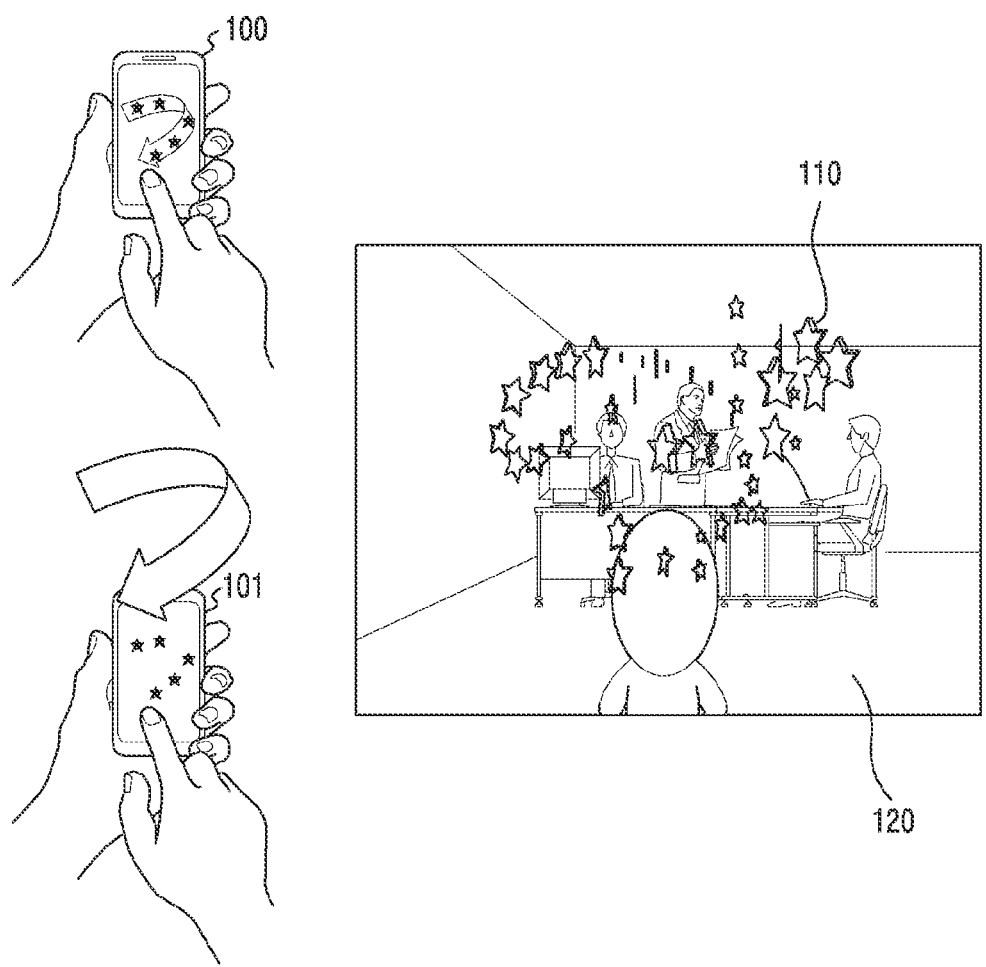
FIG. 1 is a diagram illustrating arranging a plurality of 3D objects in a 3D space in an example electronic device according to various embodiments.

FIG. 1 illustrates arranging a plurality of 3D objects 110 in a 3D space 120 in an example electronic device 100 or 101 according to various embodiments.

In an embodiment, the electronic device 100 or 101 may arrange the plurality of three-dimensional (3D) objects 110, based on a user operation. The user operation may include an operation of selecting a 3D object and an operation of touching a display of the electronic device 100 and making an arrangement path. In addition or alternatively, the user operation may be an operation of moving the electronic device 101 while touching the display of the electronic device 101.

In an embodiment, the electronic device 100 or 101 may arrange the plurality of 3D objects 110 in the 3D space 120. The electronic device 100 or 101 may provide a 3D space coordinate system, based on a camera and a sensor. Also, the electronic device may arrange the 3D object 110 at 3D space coordinates that are coordinates in a 3D space of the arrangement path provided based on the user operation.

A description will be provided below of detailed and specific operations with respect to a user, an electronic device, an arrangement of a 3D object, etc. according to various embodiments.

Figure 2:
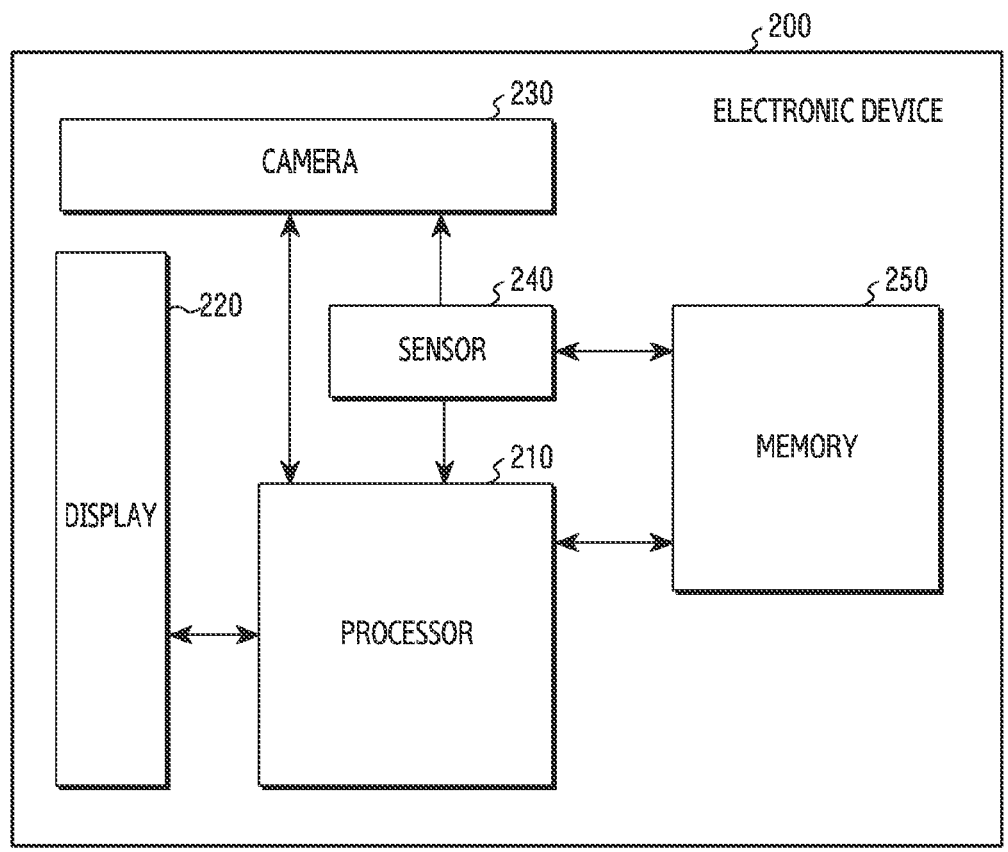
FIG. 2 is a diagram illustrating a hardware construction of an example electronic device according to various embodiments.

FIG. 2 illustrates a hardware construction of an example electronic device according to various embodiments.

According to an embodiment, the electronic device 200 may include, as the hardware construction, a processor 210 (e.g., including processing circuitry), a display 220, a camera 230, a sensor 240, and a memory 250. Also, the electronic device 200 may include, as the hardware construction, other components in addition to the above components. For example, the electronic device 200 may include the same or similar construction to a hardware construction of an electronic device 1101 described below with reference to FIG. 11.

According to an embodiment, the processor 210 may be operatively connected to the display 220, the camera 230, the sensor 240, and the memory 250, and may perform various controls according to the connection. For example, the processor 210 may display a captured image obtained using the camera 230 and the sensor 240, on the display 220, or store the captured image in the memory 250.

According to an embodiment, the display 220 may display a captured image, based on the control of the processor 210. Also, the electronic device 200 may obtain a user input through the display 220 and forward the user input to the processor 210.

According to an embodiment, the camera 230 may capture an image (e.g., a photo, a video, etc.) related to an object, a background, etc. Also, the camera 230 may include a stereo camera, an RGB camera, and a 3D camera.

According to an embodiment, the sensor 240 may include an image sensor, an acceleration sensor, an inertial sensor, a position detection sensor, and the like. The image sensor may obtain and process color information. Also, the acceleration sensor, the inertial sensor, and the position detection sensor may obtain 3D information, distance information, position information, and the like. The sensor 240 may be operatively connected to the processor 210, the camera 230, the memory 250, and the like and process the color information, the 3D information, the distance information, the position information, and the like.

According to an embodiment, the electronic device 200 may obtain the color information, the distance information, the 3D information, scale information, etc., based on the camera 230 and the sensor 240, under the control of the processor 210. Also, if necessary, the electronic device 200 may implement an obtained image as a 3D image, based on the above data, under the control of the processor 210.

According to an embodiment, the memory 250 may be connected to the processor 210 and the sensor 240, etc., and may store various data.

The electronic device 200, the processor 210, the display 220, the camera 230, the sensor 240, and the memory 250 of various embodiments may perform various operations or functions that are not limited to those mentioned in the above description.

Figure 3:
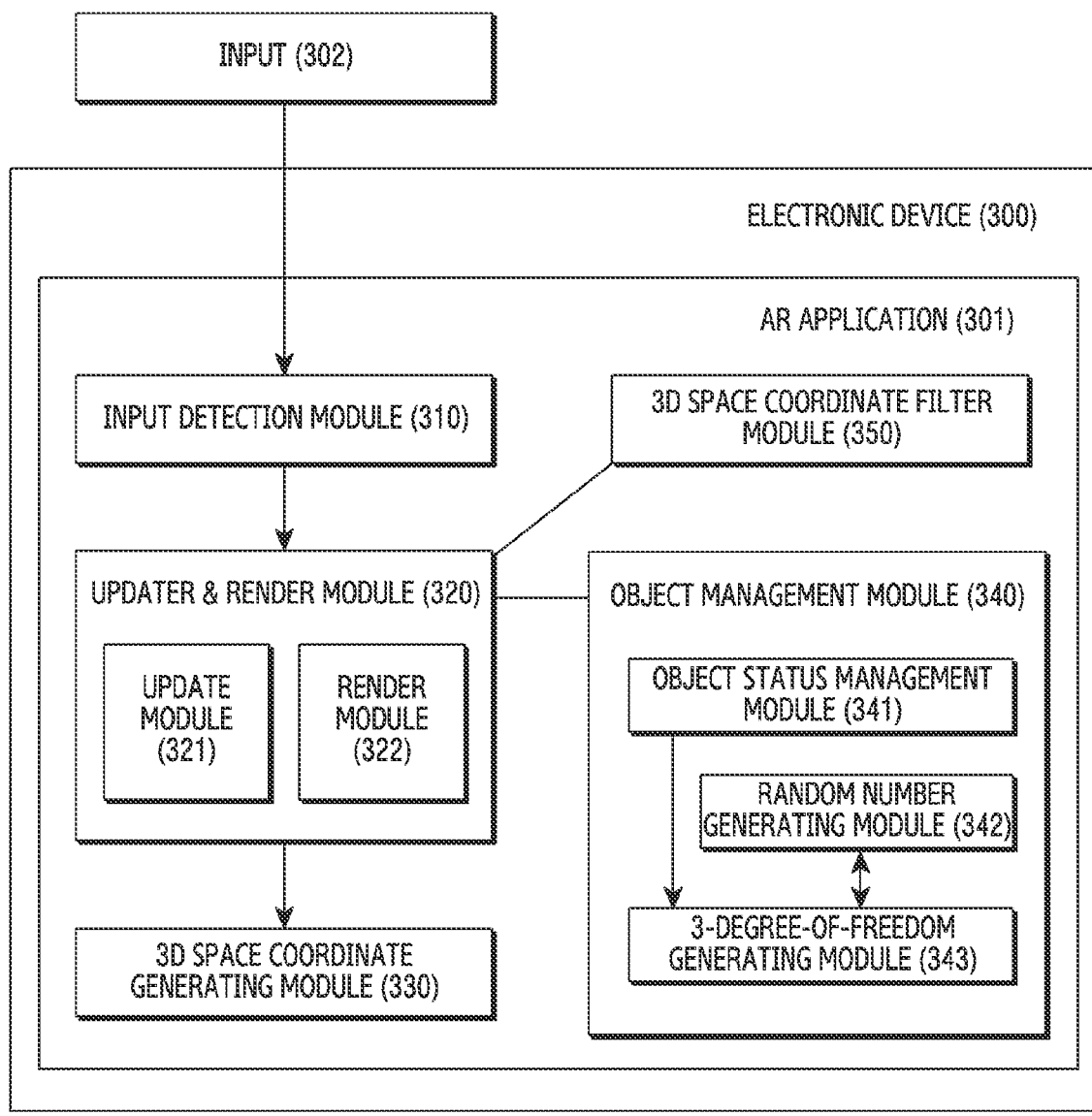
FIG. 3 is a diagram illustrating a software construction of an example electronic device according to various embodiments.

FIG. 3 illustrates a software construction of an example electronic device according to various embodiments.

According to an embodiment, the electronic device 300 may control various software to operate when an AR application 301 is executed. Control of the electronic device 300 may be performed by the processor 210 described above with reference to FIG. 2, and the electronic device 300 may include the same or similar hardware construction to that of the electronic device 200.

Various software may include an input detection module 310, an update & render module 320, a 3D space coordinate generating module 330, an object management module 340, and a 3D space coordinate filter module 350.

According to an embodiment, the input detection module 310 may receive and process a user input. For example, the input detection module 310 may determine and correct a position, a type, a trajectory, a number, coordinates, etc. of a user's 2D input.

In an embodiment, the input detection module 310 may define and manage various inputs internally. For example, the various inputs may include an input of selecting a 3D object to be arranged, a touch down, a touch move, a touch up, and the like. Specifically, for example, the touch down may be an input in which a user starts a new touch, the touch move may be an input in which a touch is continuously maintained following a previous touch, the touch up may be an input in which a touch is terminated, and the like. The input detection module 310 may distinguish inputs such as the touch down, the touch move, and the touch up, based on an internally defined rule.

In an embodiment, the input detection module 310 may determine the validity of input. Also, the input detection module 310 may correct or ignore an input from a user according to the validity determination. For example, when the user provides an unintentional hand shake while inputting, the input detection module 310 may correct or ignore the user's unintended input caused by the hand shake. The input detection module 310 may internally define a criterion (or criteria) of validity determination of the input, and determine the validity of the input.

In an embodiment, the input detection module 310 may deliver two-dimensional (2D) input information (e.g., 2D touch coordinate and corrected 2D input information) among input information, to the update & render module 320. For example, when a 2D trajectory is obtained based on a user input, the input detection module 310 may deliver information about the 2D trajectory to the update & render module 320.

In an embodiment, the update & render module 320 may be divided into an update module 321 and a render module 322. The update & render module 320 may perform various processes for an overall operation of the AR application 301, and various processes of configuring and updating a display screen.

In an embodiment, the update module 321 may manage a user input and/or information necessary for arranging or displaying a 3D object in a 3D space coordinate system. For example, the update module 321 may deliver the information necessary for arranging the 3D object in the 3D space coordinate system, to each software. Also, the update module 321 may request 3D space coordinate information from the 3D space coordinate generating module 330 in order to obtain the 3D space coordinate information. The 3D space coordinate information may include information necessary for transforming 2D coordinates corresponding to a 2D input into 3D space coordinates. Also, the update module 321 may deliver the 3D space coordinate information to the 3D space coordinate filter module 350, and receive filtered (or corrected) 3D space coordinate information.

In an embodiment, the render module 322 may perform a process that a user may recognize through a display screen of the electronic device 300. For example, the render module 322 may arrange a 3D object at 3D space coordinates of the 3D space coordinate system. For example, the render module 322 may perform a graphic processing operation of arranging the 3D object at 3D space coordinates of an image obtained based on the camera 230 and the sensor 240.

In an embodiment, the update & render module 320 may transform 2D coordinates corresponding to a user's 2D input into 3D space coordinates of the 3D space coordinate system. For example, when a user performs a 2D input of touching a display, the electronic device 300 may set 3D space coordinates at which a 3D object is to be located. For example, the electronic device 300 may arrange the 3D object in a position (e.g., an arrangement point) on specific 3D space coordinates of the 3D space coordinate system separated by a specific distance in a direction in which the camera 230 is looking (facing). As another example, the update & render module 320 may transform 2D coordinates inputted by the user on the display, into 3D space coordinates, based on a distance to an arrangement point in the electronic device 300 and/or a view matrix and projection matrix provided by the 3D space coordinate generating module 330.

In an embodiment, the 3D space coordinate generating module 330 may provide a 3D space coordinate system and 3D space coordinates. For example, a user may execute the AR application 301 and scan a surrounding space through the camera 230 and the sensor 240 of the electronic device 300. The 3D space coordinate generating module 330 of the electronic device 300 may scan a surrounding area of the electronic device 300, based on the camera 230 and the sensor 240, and provide the 3D space coordinate system.

In various embodiments, the 3D space coordinates in the 3D space coordinate system may be expressed as a view matrix or a projection matrix.

In an embodiment, the object management module 340 may include an object status management module (or an "object status manager") 341, a random number generating module (or a "random number generator") 342, and a 3-degree-of-freedom generating module (or a "3-DoF generator") 343. The object management module 340 may control an arrangement attribute of a 3D object, such as a rotation, a size, an interval, etc. of a 3D object, required for arrangement of the 3D object.

In an embodiment, the object status management module 341 may store predefined object settings in its own memory (not shown). For example, the object settings may include a set of 3D objects, a detailed arrangement method related to the arrangement of 3D objects, and the like. Also, the user may select at least one of predefined object settings, and the object status management module 341 may manage an object status, based on the object settings selected by the user.

In an embodiment, the object settings may be additionally defined by the user as well. For example, when the user additionally defines new object settings, the update & render module 320 may deliver them to the object status management module 341, based on a user's additionally defined input.

In an embodiment, the object settings may be defined by various methods. The object settings may be defined, for example, by a method of changing a rotation, a size, etc. into a predetermined value or ratio whenever a 3D object is arranged, a method of changing based on a random value, a method of using a combination of the above methods, etc. For another example, there may be a method of using a parameter used to arrange a previous object (e.g., a 3D object) as well. In this case, the object status management module 341 may obtain additional elements such as a velocity, an angular velocity, etc. for elements such as a rotation, a size, etc. of the 3D object, and use the additional elements when providing a next parameter.

In an embodiment, the object status management module 341 may receive an object status from the update & render module 320. The object status may be, for example, first object arrangement, intermediate object arrangement, last object arrangement, and the like. The object status management module 341 may provide a parameter necessary for arrangement of a 3D object, based on the received object status and object settings, using the random number generating module 342 and the 3-degree-of-freedom generating module 343. The object status management module 341 may deliver the object settings to the 3-degree-of-freedom generating module 343.

In an embodiment, the random number generating module 342 may provide a random value. The electronic device 300 may arrange a 3D object, based on the random value provided by the random number generating module 342. For example, the electronic device 300 may arrange various types of 3D objects in a predetermined order, or may arrange them in a random order, based on the random value. For another example, the electronic device 300 may arrange 3D objects at regular intervals, or may arrange the 3D objects at random intervals, based on the random value.

In an embodiment, the random number generating module 342 may selectively determine whether to provide a random value according to a setting of the electronic device 300, a setting of a user, etc.

In an embodiment, the 3-degree-of-freedom generating module 343 may provide and store a parameter related to arrangement of a 3D object. For example, the 3-degree-of-freedom generating module 343 may receive object settings from the object status management module 341. Also, the 3-degree-of-freedom generating module 343 may prepare a parameter storage space according to a request from the object status management module 341. The 3-degree-of-freedom generating module 343 may newly provide a parameter of determining the arrangement of a next object (e.g., a 3D object), based on data stored in the parameter storage space and received object settings. The newly provided parameter may be used for object arrangement, and may be stored again in the parameter storage space. The electronic device 300 may repeatedly perform the above-described parameter provision and storage operations, and harmoniously arrange a plurality of objects.

In an embodiment, the 3D space coordinate filter module 350 may correct (or filter) 3D space coordinate information (e.g., a trajectory, etc.) and remove noise and the like. For example, the 3D space coordinate filter module 350 may remove or correct unnecessary information, such as noise included in newly obtained 3D space coordinate information (e.g., 3D space coordinates), through comparison with 3D space coordinate information previously obtained by the electronic device 300.

In various embodiments, the 3D space coordinate filter module 350 may selectively determine whether to apply the removal of noise, etc. through correction (or filtering) of 3D space coordinate information (e.g., a trajectory, etc.) according to the setting of the electronic device 300 or the setting of the user.

Figure 4:
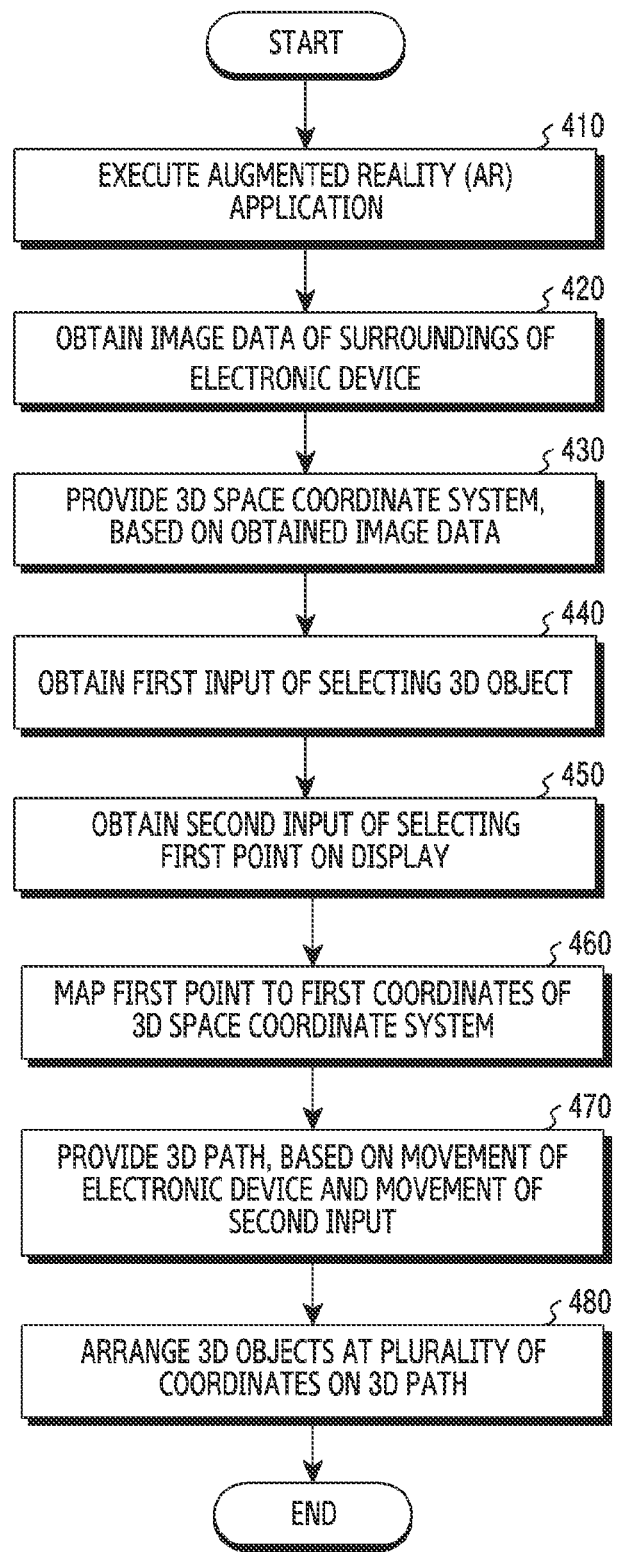
FIG. 4 is a diagram illustrating an overall flow in which an application of an example electronic device is operated according to various embodiments.
Figure 5:
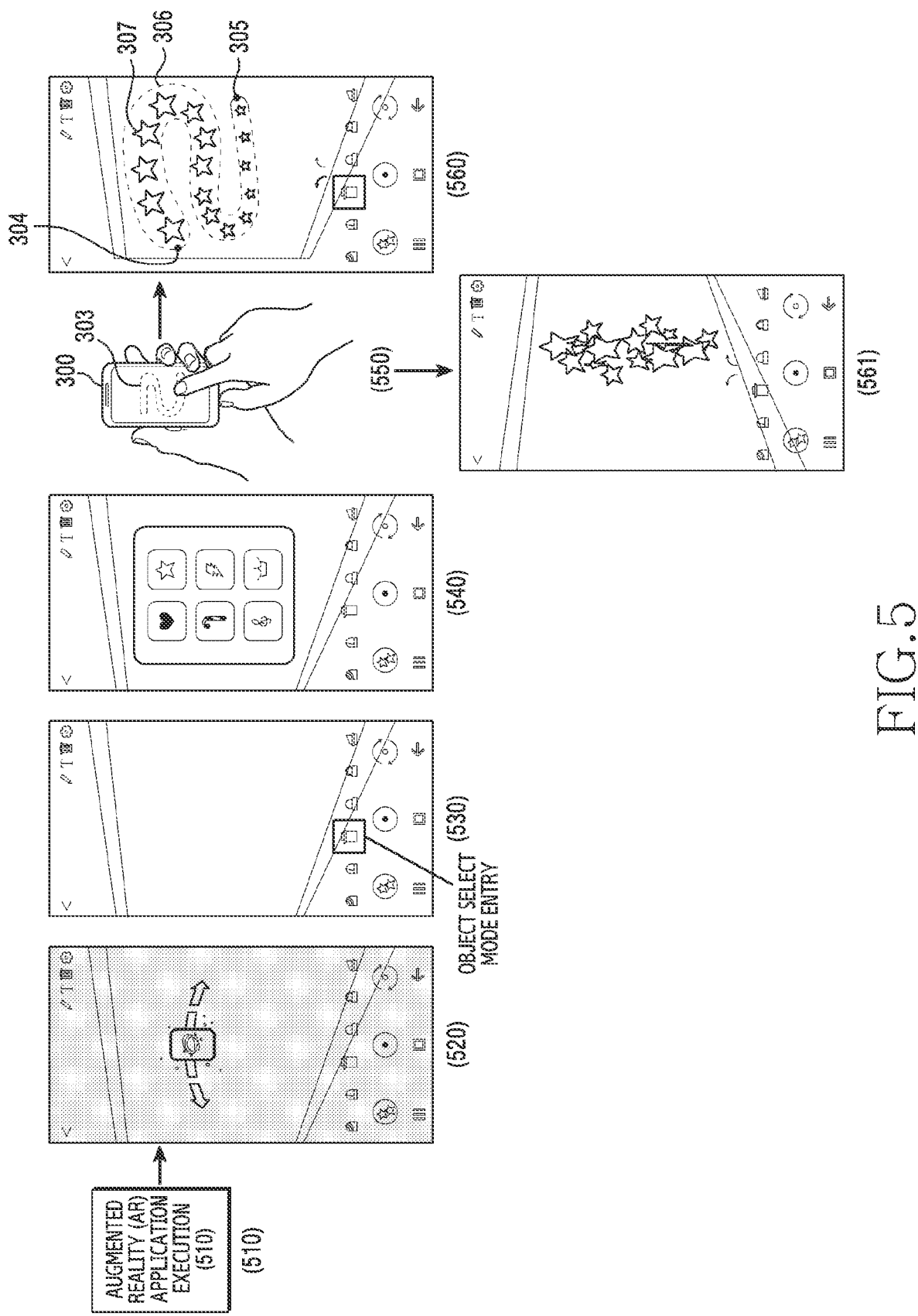
FIG. 5 is a diagram illustrating a user interface (UI) related to an overall flow in which an application of an example electronic device is operated according to various embodiments.

FIG. 4 illustrates an overall flow in which an example electronic device operates according to various embodiments. Operations 410, 420, 430, 440, 450, 460, 470, and 480 of FIG. 4 will be described with reference to FIG. 5 illustrating various embodiments related to a user interface (UI) of an application of an example electronic device.

According to various embodiments, the electronic device 300 may correspond to the electronic device 200 of FIG. 2, and operations of the electronic device 300 may be based on the control of a processor (e.g., the processor 210).

According to an embodiment, in operation 410 and operation 510, the electronic device 300 may execute an augmented reality (AR) application. The electronic device 300 may execute the application when obtaining a user's application execution input. The execution input may be implemented in various methods, such as a method of touching an icon, a method of using a voice, and the like.

According to an embodiment, in operation 420, the electronic device 300 may obtain surrounding image data. Referring to operation 520 of FIG. 5, after the user executes the AR application, the user may point the camera 230 of the electronic device 300 toward an area where a 3D object is to be arranged. Also, the electronic device 300 may display a guide screen indicating that image data is being obtained immediately after the AR application is executed. The electronic device 300 may obtain data of feature points (e.g., an edge, a corner, etc.) existing on the guide screen. The electronic device 300 may obtain image data including distance data, 3D data, etc. in addition to the feature point data.

In an embodiment, when the guide screen is displayed, the electronic device 300 may not perform another operation until a sufficient number of feature points are secured. In this case, the user may perform a scanning operation (e.g., an operation of moving the electronic device 300 up/down/left/right, etc.) in order to quickly secure the feature points. The electronic device 300 may scan a wider area according to a range of the scanning operation.

In an embodiment, operation 420 and operation 520 may be pre-works necessary for the user to stably arrange various objects in a virtual 3D space.

According to an embodiment, in operation 430, the electronic device 300 may provide a 3D space coordinate system, based on the obtained image data. For example, the electronic device 300 may provide the 3D space coordinate system using the camera 230 (e.g., a stereo camera, a 3D camera, etc.) and the sensor 240 (e.g., a distance sensor, an acceleration sensor, etc.).

According to an embodiment, in operation 440, the electronic device 300 may obtain a first input of selecting a 3D object.

Referring to operation 530 and operation 540 of FIG. 5, for example, the user can perform an input of entering a mode for selecting a 3D object (e.g., touching an icon of entering a mode of selecting an object) as shown in operation 530. When the electronic device 300 obtains the user input of entering the mode of selecting the 3D object, the electronic device 300 may convert to a mode of selecting the type, etc. of the 3D object.

In an embodiment, the electronic device 300 may obtain a first input in which the user selects a 3D object (e.g., a star-shaped 3D object) as shown in operation 540. For example, the first input may be an operation of tapping one of the buttons. When obtaining the first input, the electronic device 300 may return to a screen shown in operation 530 and enter a standby state for receiving a subsequent user input (e.g., a second input and/or the movement of the second input). Also, the electronic device 300 may obtain an input of selecting one of predefined object settings in an object selection mode as well.

According to an embodiment, in operation 450, the electronic device 300 may obtain a second input of selecting a first point on a display, and in operation 460, the electronic device 300 may map the first point to first coordinates 304 of a 3D space coordinate system. For example, the user may perform an input of touching the first point, in order to arrange the star-shaped 3D object as the first object on the display. The electronic device 300 may map the first point to the first coordinates 304 of the 3D space coordinate system, and the star-shaped 3D object may be arranged on the first coordinates 304.

According to an embodiment, in operation 470, the electronic device 300 may provide a 3D path, based on the movement of the electronic device 300 and the movement of the second input. For example, as shown in operation 550 of FIG. 5, the user may provide a 2D path (e.g., a 2D trajectory) 303, based on the movement of the second input from the first point to another (e.g., predetermined) point on the display. The electronic device 300 may provide a 3D path (e.g., a 3D trajectory) 306 in the 3D space coordinate system, based on the 2D path 303.

Also, when the user performs an input (e.g., touch up) of stopping a touch, the electronic device 300 may determine coordinates (e.g., second coordinates 305) of the 3D space coordinate system corresponding to a point where the touch is stopped, as coordinates where the 3D path 306 ends. The 3D path 306 may be a path that is moved according to the movement of the second input from the first coordinates 304 to the second coordinates 305.

According to an embodiment, in operation 480, the electronic device 300 may arrange the 3D objects at a plurality of coordinates on the 3D path 306. For example, when the user performs an input (e.g., touch up) of stopping a touch, the electronic device 300 may arrange 3D objects (e.g., star-shaped 3D objects) 307 at a plurality of coordinates on the 3D path 306, based on object settings, as shown in operation 560 of FIG. 5. For another example, since the arrangement on the 3D path 306 of the electronic device 300 is done in 3D, the arrangement may be done as shown in operation 561 of FIG. 5, when viewed from the side. Also, in a state of operation 560 or operation 561, the electronic device 300 may repeatedly perform the arrangement of an additional 3D object 307.

Figure 6:
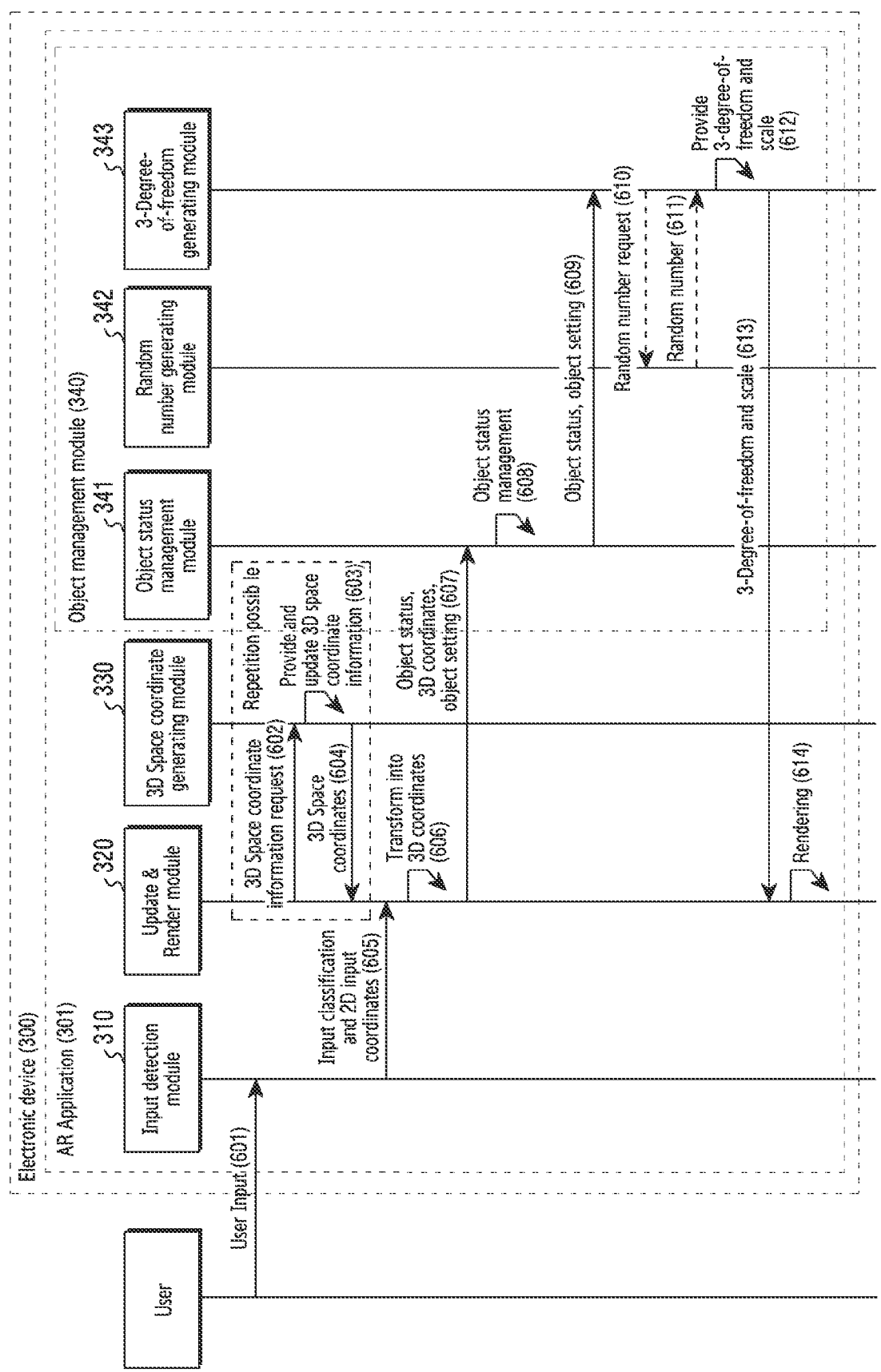
FIG. 6 is a diagram illustrating a detailed flow in which an application of an example electronic device is operated according to various embodiments.

FIG. 6 illustrates a detailed flow in which the AR application 301 of the example electronic device 300 operates according to various embodiments.

According to various embodiments, the electronic device 300 may correspond to the electronic device 200 of FIG. 2, and operations of the electronic device 300 may be based on control of a processor (e.g., the processor 210).

According to an embodiment, in operation 601, the input detection module 310 may process a user input.

In an embodiment, the input detection module 310 may continuously check the user input from a time point when the electronic device 300 executes the AR application 301 to a time point when the AR application 301 is terminated, and may deliver data about the user input to other modules (e.g., the update & render module 320, etc.). For example, the input detection module 310 may continuously check an input of user's selecting a 3D object, an input of arranging the 3D object on a 3D space, an input of additionally arranging a 3D object on the 3D space, etc., and deliver this to the update & render module 320.

In an embodiment, the user input may be an input of touching a body part such as a finger, etc. on a display (e.g., the display 220), or touching using a tool such as a stylus pen, etc. Also, the user input may be a 2D input (e.g., a single-touch input (tap), an input of providing a 2D path, etc.).

According to an embodiment, in operation 602, the update & render module 320 may request information on 3D space coordinates to the 3D space coordinate generating module 330 in order to process the 3D object on the 3D space. The information on the 3D space coordinates may include, for example, information on 3D space coordinate provision and/or 3D space coordinate update.

According to an embodiment, in operation 603, the 3D space coordinate generating module 330 may provide and update the 3D space coordinate information. For example, the 3D space coordinate generating module 330 may provide a 3D space coordinate system or update the existing 3D space coordinate system, based on a camera (e.g., the camera 230), a sensor (e.g., the sensor 240), and image data (e.g., feature point data, distance data, 3D data, etc.). Also, the 3D space coordinate generating module 330 may repeatedly perform an operation of providing or updating the 3D space coordinate system while the AR application 301 is running The repetitively performed operation may be done regardless of the user input.

In an embodiment, the 3D space coordinate generating module 330 may estimate 6-degree-of-freedom (DoF) information including a position, a rotation direction, etc. in the 3D space coordinate system of the electronic device 300, based on the camera (e.g., the camera 230), the sensor (e.g., the sensor 240), the image data (e.g., feature point data, distance data, 3D data, etc.), etc.

In an embodiment, among 6-degree-of-freedom, 3-degree-of-freedom may include information on position or movement, and remaining 3-degree-of-freedom may include information on orientation. Among the 6-degree-of-freedom, the 3-degree-of-freedom may be expressed by x, y, and z values, and may present position information of the electronic device 300. The remaining 3-degree-of-freedom may be expressed by values of a rotation (pitch) about an x axis, a rotation (yaw) about a y axis, and a rotation (roll) about a z axis, and may provide orientation information of the electronic device 300. The estimating of the 6-degree-of-freedom information may not only detect the position information of the electronic device 300 and the movement information corresponding thereto, but also obtain the orientation information of the electronic device 300. The estimated 6-degree-of-freedom information may be basic information of displaying the 3D object on a display screen.

In an embodiment, the 3D space coordinate generating module 330 may repeatedly perform an operation of estimating the 6-degree-of-freedom information while the AR application 301 is running The repetitively performed operation may be done regardless of a user input.

According to an embodiment, in operation 604, the 3D space coordinate generating module 330 may deliver a view matrix and a projection matrix that are information on 3D space coordinates, to the update & render module 320.

According to an embodiment, the electronic device 300 may continuously and repeatedly perform operations 602 to 604, unless otherwise set.

According to an embodiment, in operation 605, the input detection module 310 may classify the user inputs and determine coordinates, etc. of the 2D inputs. For example, the input detection module 310 may perform a determination of classifying the type of input into an input of user's starting a touch, an input of moving a touch, an input of lifting a body part such as a finger, etc. and/or a tool such as a stylus pen, etc. on the display in order to end the touch, and the like. For another example, the input detection module 310 may determine coordinates, etc. of a 2D input inputted by the user as well.

In an embodiment, the input detection module 310 may deliver information of distinguishing the user input, information on the coordinates of the 2D input, and the like, to the update & render module 320.

According to an embodiment, in operation 606, the update & render module 320 may transform coordinates of the user's 2D input into 3D space coordinates. For example, the update & render module 320 may receive information about the user's 2D input from the input detection module 310. The information on the 2D input may include the coordinates of the 2D input, a position of the 2D input, and the like. The update & render module 320 may transform the coordinates of the 2D input into the 3D space coordinates, based on 3D space coordinate information obtained from the 3D space coordinate generating module 330 (e.g., mapping 2D coordinates to 3D coordinates on the 3D space coordinate system). For example, there may be a case in which an input (e.g., a second input) of user's selecting a 3D object (e.g., a star-shaped 3D object) to be arranged and then arranging the 3D object is provided as a 2D input on the display. As obtaining the second input, the electronic device 300 may transform the 2D input into 3D space coordinates in the 3D space coordinate system and arrange the 3D object at 3D space coordinates.

According to an embodiment, in operation 607, the update & render module 320 may send an object status, information (e.g., the 3D coordinates of the 3D object, etc.) on 3D space coordinates, and/or information on object settings, etc., to the object status management module 341 of the object management module 340.

In an embodiment, the object setting delivered from the update & render module 320 to the object status management module 341 may simply be an object setting selected by the user among predefined object settings, or be an object setting newly defined by the user.

In an embodiment, the update & render module 320 may determine an object status related to a condition of arranging a 3D object, based on the information on the 3D space coordinates and the user input (e.g., the second input and/or the movement of the second input). The object status may include, for example, states such as first object arrangement, intermediate object arrangement, and last object arrangement.

In an embodiment, the object status may correspond to a user input in a one-to-one ratio. For example, the second input (e.g., a touch down) may be a state of the first object arrangement, the movement (e.g., a touch move) of the second input may be a state of the intermediate object arrangement, and an input (e.g., a touch up) of end of the second input may be a state of the last object arrangement.

In another embodiment, even if the user input is the second input (e.g., the touch down), when an amount of change of 3D space coordinates is sufficiently large according to the movement of the electronic device 300, it may have the intermediate object arrangement state as well. For example, when the user moves the electronic device 300 without moving an input tool (e.g., a finger, a stylus pen, etc.) in a state in which the user performs the second input to the electronic device 300, it may have the intermediate object arrangement state because it may mean that the 3D coordinates of the 3D object are moved.

According to an embodiment, in operation 608, the object management module 340 may perform overall processing required for providing parameters necessary for object arrangement.

In an embodiment, the object status management module 341 of the object management module 340 may check the validity of the object status received from the update & render module 320 and perform a process for an appropriate operation.

For example, after receiving the object status (e.g., the first object arrangement), the object status management module 341 may receive a subsequent object status (e.g., the intermediate object arrangement and/or the last object arrangement). When receiving the same object status (e.g., the first object arrangement) twice in succession, the object status management module 341 may check the validity of the received object status and process it as invalid. The electronic device 300 may sequentially perform one or two or more object arrangements, based on the plurality of object statuses and the 3D space coordinate information.

According to an embodiment, in operation 609, the object status management module 341 may deliver the object status, the object settings, and the like to the 3-degree-of-freedom generating module 343. Also, when it is determined that the object status (e.g., the first object arrangement) is valid, the object status management module 341 may request to prepare a parameter storage space in the 3-degree-of-freedom generating module 343. For example, the 3-degree-of-freedom generating module 343 may provide the parameter storage space, and the object status management module 341 may manage the parameter storage space. Also, the object status management module 341 may delete the parameter storage space after the object status of the last object arrangement.

In an embodiment, the object status management module 341 may request the 3-degree-of-freedom generating module 343 to provide a parameter necessary for object arrangement according to the object status. For example, the 3-degree-of-freedom generating module 343 may newly provide a parameter for determining next object arrangement (e.g., the intermediate object arrangement, the last object arrangement, etc.), based on the data stored in the parameter storage space and the received object setting.

In an embodiment, the 3-degree-of-freedom generating module 343 may store and use information (e.g., a parameter necessary for object arrangement) used for arranging an already arranged object in order to harmonize with the already arranged object. For example, there may be a case in which a rotation angle of continuous object arrangement is a rotation angle of a predetermined difference with respect to a specific axis. In this case, the parameter storage space of the 3-degree-of-freedom generating module 343 may store a rotation angle of object arrangement, and may use the stored rotation angle for the arrangement of a continuous next object.

According to an embodiment, in operation 610, the 3-degree-of-freedom generating module 343 may request a random number (random value) from the random number generating module 342 in order to add a random element to a parameter that will be provided based on the object setting. The operation of requesting the random number (a random value) may be an optional operation.

According to an embodiment, in operation 611, the random number generating module 342 may provide a random value existing within a range of a predetermined value. For example, the range of the predetermined value may be a range of a value that the random number generating module 342 receives from the 3-degree-of-freedom generating module 343. Also, the 3-degree-of-freedom generating module 343 may set a range of the provided random value. The random number generating module 342 may deliver the provided random value to the 3-degree-of-freedom generating module 343.

According to an embodiment, in operation 612, the 3-degree-of-freedom generating module 343 may provide a parameter related to 3-degree-of-freedom (3-axis rotation direction), scale (size of object), and the like.

In an embodiment, the 3-degree-of-freedom generating module 343 may determine the type, rotation, size, etc. of an object to be arranged, based on the parameter related to the 3-degree-of-freedom (3-axis rotation direction), the scale (size of the object), and the like, the object settings, and/or the provided random value.

According to an embodiment, in operation 613, the 3-degree-of-freedom generating module 343 may deliver the parameter related to the 3-degree-of-freedom (3-axis rotation direction), the scale (size of the object), and the like to the update & render module 320.

According to an embodiment, in operation 614, the update & render module 320 may arrange the object (e.g., the 3D object) at 3D space coordinates on the 3D space, based on the 3-degree-of-freedom (three-axis rotation direction), the scale (e.g., the size of the object), and the information on the 3D space coordinates, and the electronic device 300 may display the arranged 3D object on a display screen.

Figure 7:
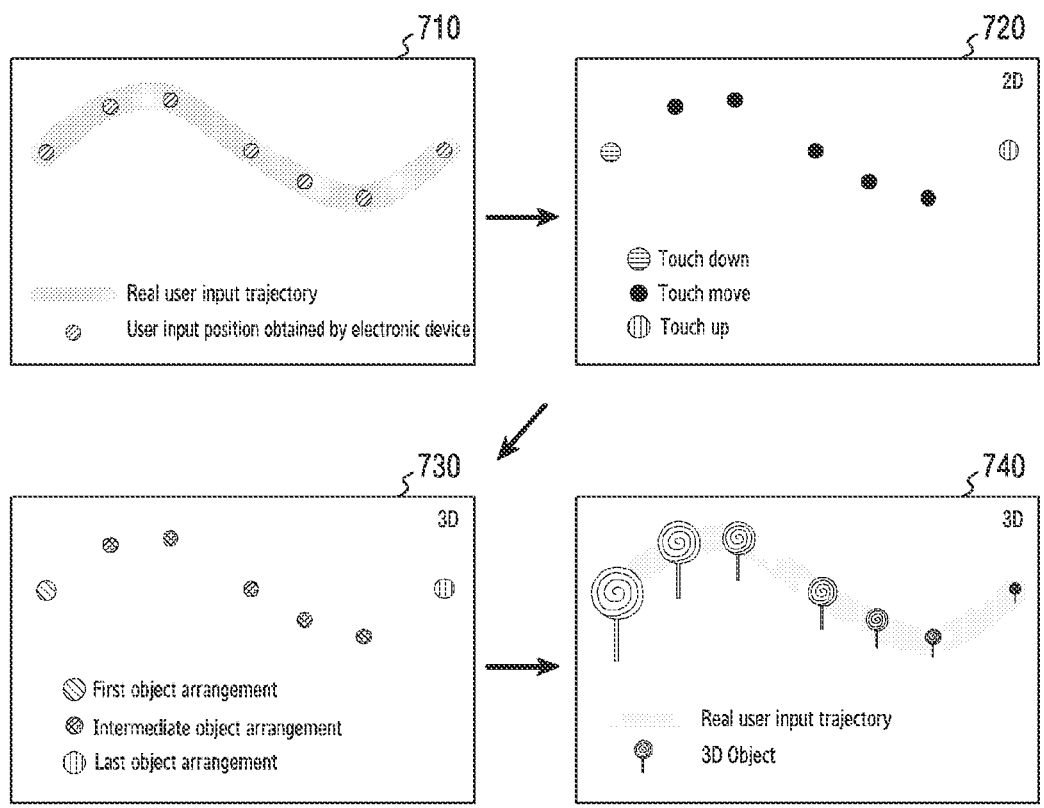
FIG. 7 is a diagram illustrating an example process of arranging a plurality of 3D objects according to a user input according to various embodiments.

FIG. 7 illustrates an example process of arranging a plurality of 3D objects according to a user input according to various embodiments.

According to various embodiments, the electronic device 300 may correspond to the electronic device 200 of FIG. 2, and operations of the electronic device 300 may be based on control of a processor (e.g., the processor 210).

According to an embodiment, in operation 710, a user may provide an input trajectory on a display through a second input (e.g., touching the display with a finger), the movement of the second input (e.g., providing a trajectory through the finger on the display), and an input of terminating the second input (e.g., lifting your finger on the display). For example, the input trajectory based on the real user's second input may be a 2D curve as shown in operation 710 of FIG. 7. In this case, the electronic device 300 may obtain a plurality of 2D coordinates on a 2D curve (2D trajectory).

According to an embodiment, in operation 720, the input detection module 310 of the electronic device 300 may analyze and process the user's second input. For example, the input detection module 310 may determine that the leftmost 2D coordinates by the second input are a touch down, the right-most 2D coordinates by the end of the second input are a touch up, and the remaining 2D coordinates by the movement of the second input are a touch move.

According to an embodiment, in operation 730, the input detection module 310 of the electronic device 300 may deliver information on the plurality of 2D coordinates and the second input described above, to the update & render module 320. The update & render module 320 may transform 2D coordinates into 3D coordinates of a 3D space coordinate system, based on 3D space coordinate information provided by the 3D space coordinate generating module 330. Also, the update & render module 320 may determine an object status, which is a condition of object provision and arrangement, based on the 3D space coordinate information, an object setting, and the user input. Also, the update & render module 320 may deliver the determined object status to the object management module 340.

According to an embodiment, in operation 730, the object management module 340 of the electronic device 300 may perform an operation(s) such as providing, storing, and deleting information of arranging an object (e.g., a 3D object), based on the received object status. For example, the object management module 340 may provide a storage space for storing information (e.g., a parameter) on object arrangement in relation to first object arrangement, and the first arranged object may be arranged in a specific size according to the object setting. Also, the object management module 340 may store information on a size of an already arranged 3D object and information on a total number of 3D objects, in the parameter storage space. For another example, the object management module 340 may provide information of adjusting a size of a 3D object (intermediate object and last object) to be arranged subsequently, based on the stored parameter and object setting. For example, the object management module 340 may provide information of transforming a size of a subsequently arranged 3D object into a size decreased or increased by a ratio (e.g., a predetermined ratio) from a size of a previously arranged 3D object. Or, the object management module 340 may provide information of adjusting the size of the subsequently arranged 3D object in proportion to the information on the total number of the arranged 3D objects. The object management module 340 may provide information of randomly changing the size of the 3D object according to a user's touch trajectory as well.

According to an embodiment, in operation 740, the electronic device 300 may arrange the plurality of 3D objects on a display screen of the electronic device 300, based on the information provided by the object management module 340. For example, the object management module 340 may provide information of transforming the size of the subsequently arranged 3D object into the size decreased by the predetermined ratio from the size of the previously arranged 3D object. In this case, the electronic device 300 may transform the plurality of 3D objects into the size decreased by the predetermined ratio from the size of the previously arranged 3D object, based on the above information, and arrange the plurality of 3D objects on the display screen of the electronic device 300.

Figure 8A:
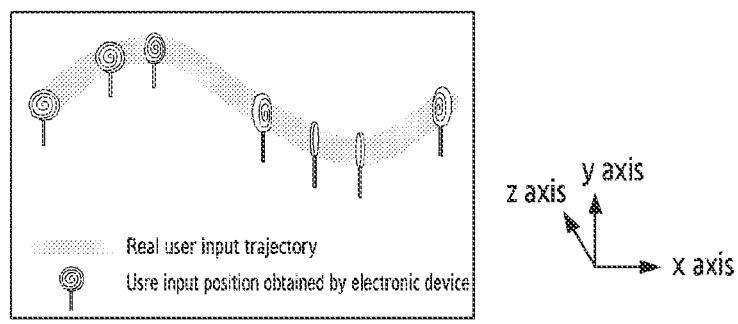
FIG. 8A is a diagram illustrating an example state of arranging a plurality of 3D objects with an arrangement attribute corresponding to an input attribute according to a user input according to various embodiments.

FIG. 8A illustrates an example state of arranging a plurality of 3D objects with an arrangement attribute corresponding to an input attribute according to a user input according to various embodiments. The arrangement attribute corresponding to the input attribute may be a rotation angle or rotation direction of a 3D object dependent on a user input trajectory.

Figure 8B:
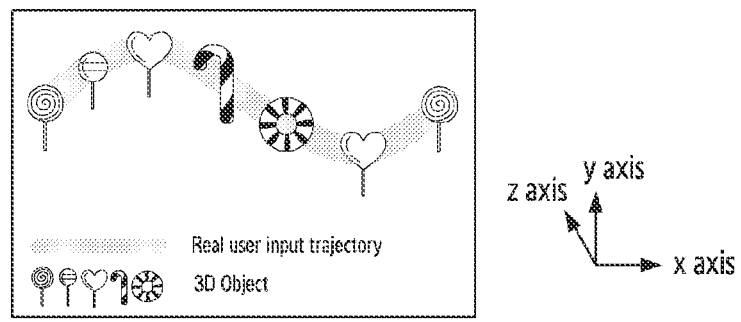
FIG. 8B is a diagram illustrating an example state of arranging a plurality of 3D objects with an arrangement attribute corresponding to an input attribute according to a user input according to various embodiments.
Figure 8C:
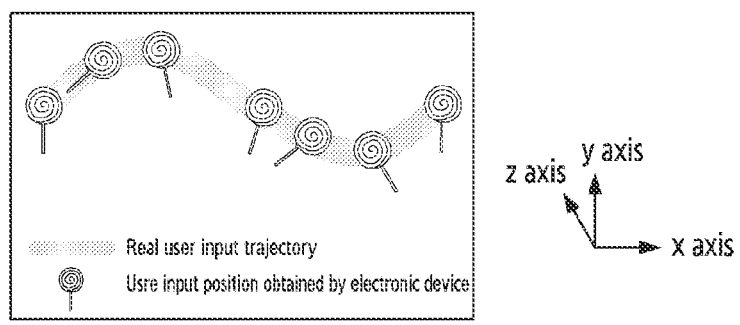
FIG. 8C is a diagram illustrating an example state of arranging a plurality of 3D objects with an arrangement attribute corresponding to an input attribute according to a user input according to various embodiments.

In an embodiment, an example operation of the object management module 340 and the like will be described referring together to FIG. 8A and FIG. 8C illustrating a state in which the plurality of 3D objects are arranged based on the arrangement attribute (e.g., a rotation angle, a rotation direction, a rotation axis, etc.) corresponding to the input attribute, based on a user input.

In an embodiment, the object management module 340 of the electronic device 300 may provide a storage space for storing information (e.g., a rotation angle parameter, a rotation direction parameter, a rotation axis parameter, etc.) on object arrangement in relation to first object arrangement, and may provide information of arranging a first arranged object at a specific angle with a criterion of a specific rotation axis according to an object setting.

In an embodiment, the object management module 340 of the electronic device 300 may store information on an already arranged 3D object (e.g., a rotation angle parameter of the 3D object, a rotation direction parameter of the 3D object, and/or a rotation axis parameter of the 3D object), information on a total number of 3D objects (e.g., a parameter of the total number of 3D objects), etc., in a parameter storage space.

In an embodiment, the object management module 340 of the electronic device 300 may provide information (e.g., a rotation angle adjustment parameter) of adjusting a rotation angle of a 3D object (intermediate object and last object) to be arranged subsequently, based on an object setting previously set by a user. For example, as shown in FIG. 8A, the object management module 340 may provide information of adjusting the rotation angle of the 3D object to be arranged, based on the object setting (e.g., arranging with a rotation angle difference of 45° for each object) preset by the user. The object management module 340 may provide information of arranging at an angle of 0°, 45°, 90°, 135°, 180°, 225°, 270°, 315°, and 360° when there are nine 3D objects to be arranged. The electronic device 300 may arrange the 3D objects at angles of 0°, 45°, 90°, 135°, 180°, 225°, 270°, 315°, and 360°, based on the information.

In an embodiment, the object setting of the electronic device 300 may be variously set in advance by the user for a rotation axis (e.g., x axis, y axis, z axis, etc.), a rotation direction (e.g., a counterclockwise direction, a clockwise direction, etc.), a rotation angle, an arrangement interval, and the like.

In an embodiment, the object management module 340 of the electronic device 300 may provide information of adjusting a rotation angle of a 3D object (intermediate object and last object) to be arranged subsequently, based on the stored parameter and object setting. For example, the object management module 340 may provide information of arranging a subsequently arranged 3D object at an angle of rotating a predetermined size from an angle of a previously arranged 3D object. Or, the object management module 340 may provide information of adjusting a rotation angle of a subsequently arranged 3D object to associate the subsequently arranged 3D object with information on a total number of arranged 3D objects. For example, when the total number of 3D objects is 6, 60° obtained by dividing 360° into 6 equal parts may be used as the rotation angle. Or, when the total number of 3D objects is 10, the object management module 340 may provide information of arranging 3D objects at 60°, 180°, 240°, 300°, 360°, 420°, 480°, 540°, 600°, and 660°, respectively, by using a preset 60° as a rotation angle. The electronic device 300 may arrange the 3D objects at 60°, 180°, 240°, 300°, 360°, 420°, 480°, 540°, 600°, and 660°, respectively, based on the information.

In an embodiment, the object management module 340 of the electronic device 300 may provide information of randomly changing a rotation angle, a rotation direction, a rotation axis, etc. of a 3D object. For example, as shown in FIG. 8C, the object management module 340 may provide information of randomly changing a rotation angle of each 3D object, such as a 60° difference, a 45° difference, etc. and may provide information of randomly changing even a rotation direction of each 3D object, such as a counterclockwise direction, a clockwise direction, etc. Also, the object management module 340 may provide information capable of randomly changing even a rotation axis, which is a basis of rotation, such as x axis, y axis, and z axis, or provide information capable of presenting one or more axes as the rotation axis.

FIG. 8B illustrates an example state of arranging a plurality of 3D objects with an arrangement attribute corresponding to an input attribute according to a user input according to various embodiments. The arrangement attribute corresponding to the input attribute may be the type of a 3D object dependent on a user input trajectory.

In an embodiment, the object management module 340 of the electronic device 300 may provide information capable of randomly changing the type of a 3D object, or capable of changing the type of the 3D object in a predetermined order, as shown in FIG. 8B. For example, the object management module 340 may provide information of allowing the electronic device 300 to arrange 3D objects randomly within a range of an object setting (e.g., a setting for a range of the 3D object type) set by a user. Also, the object management module 340 may provide information of allowing the electronic device 300 to arrange the 3D objects in a set order, based on the user's object setting (e.g., a setting for an arrangement order dependent on the 3D object type). For another example, the object management module 340 may provide information of allowing the electronic device 300 to arrange 3D objects belonging to a set of predefined 3D object types randomly, based on a user input of selecting the set. Or, the object management module 340 may provide information of allowing the electronic device 300 to arrange the 3D objects belonging to the set of predefined 3D object types in a predetermined order, based on the user input of selecting the set.

Figure 8D:
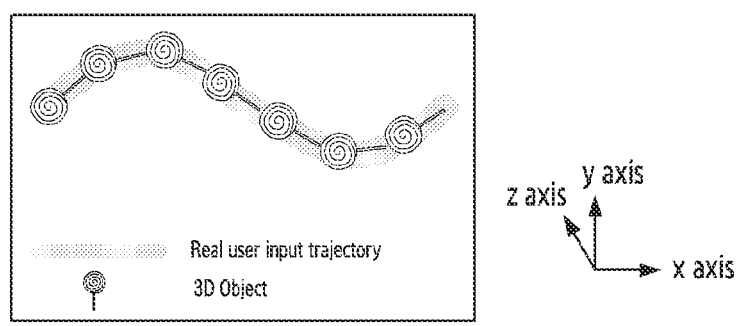
FIG. 8D is a diagram illustrating an example state of arranging a plurality of 3D objects with an arrangement attribute corresponding to an input attribute according to a user input according to various embodiments.

FIG. 8D illustrates an example state of arranging a plurality of 3D objects with an arrangement attribute corresponding to an input attribute according to a user input according to various embodiments. The arrangement attribute corresponding to the input attribute may be a rotation direction of a 3D object dependent on a progress direction of a user input trajectory.

In an embodiment, the object management module 340 of the electronic device 300 may provide information of changing the rotation of a 3D object, based on a user input trajectory. For example, the object management module 340 may provide information of arranging the 3D object in parallel to a progress direction of an input trajectory as shown in FIG. 8D. The electronic device 300 may arrange the 3D object in parallel to the progress direction of the user input trajectory, based on the information. For another example, the object management module 340 may provide information of arranging the 3D object perpendicularly to the progress direction of the input trajectory. The electronic device 300 may arrange the 3D object perpendicularly to the progress direction of the user input trajectory, based on the information.

Also, in an embodiment, the object management module 340 of the electronic device 300 may provide information of arranging a 3D object to form a specific angle to the progress direction of the input trajectory, and the electronic device 300 may arrange the 3D object to form the specific angle to the progress direction of the user input trajectory, based on the information as well.

Figure 8E:
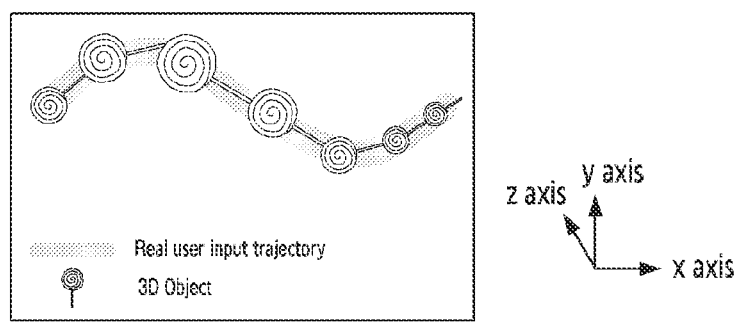
FIG. 8E is a diagram illustrating an example state of arranging a plurality of 3D objects with an arrangement attribute corresponding to an input attribute according to a user input according to various embodiments.

FIG. 8E illustrates an example state of arranging a plurality of 3D objects with an arrangement attribute corresponding to an input attribute according to a user input according to various embodiments. The arrangement attribute corresponding to the input attribute may be the size of a 3D object dependent on a user input speed.

In an embodiment, the object management module 340 of the electronic device 300 may provide information of changing the size of the 3D object, based on a user input speed. For example, the object management module 340 may provide information of adjusting the size of the 3D object in proportion to an input speed and arrange the 3D object, as shown in FIG. 8E. Specifically, for example, the object management module 340 may obtain information on an input speed, based on a distance between coordinates of obtaining a user's arrangement input. The electronic device 300 may arrange the 3D object having the size proportional to the user input speed, based on the information on the input speed.

Figure 8F:
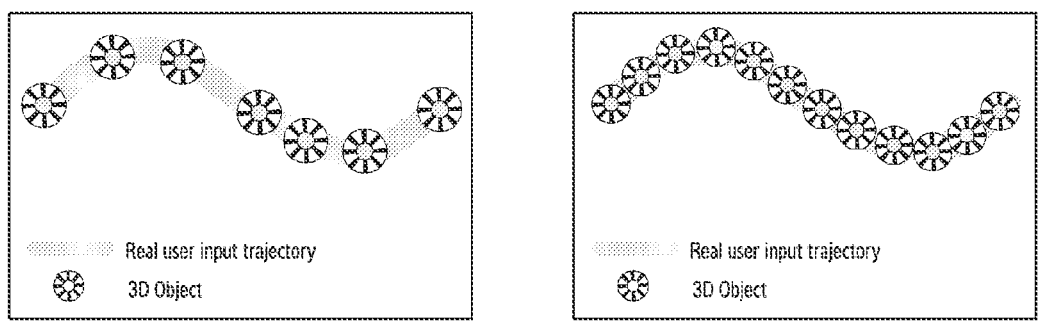
FIG. 8F is a diagram illustrating an example state of arranging a plurality of 3D objects with an arrangement attribute corresponding to an input attribute according to a user input according to various embodiments.

FIG. 8F illustrates an example state of arranging a plurality of 3D objects with an arrangement attribute corresponding to an input attribute according to a user input according to various embodiments. The arrangement attribute corresponding to the input attribute may be an expected arrangement position of a 3D object based on an object status and a 3D space coordinate.

In an embodiment, the arrangement of the 3D object may be performed based on object status and 3D space coordinate information received from the update & render module 320 of the electronic device 300.

For example, when a distance between 3D space coordinates is long, there may be a coordinate in which the 3D object is not provided. In addition to the received 3D space coordinate information, the object management module 340 may determine virtual 3D space coordinates corresponding to a position where a real user input trajectory is expected to exist. Also, the object management module 340 may provide information of arranging 3D objects at regular intervals. As shown in FIG. 8F, the electronic device 300 may arrange a 3D object in a position where a real user input trajectory is expected to exist.

Although not shown in FIGS. 8A, 8B, 8C, 8D, 8E, and 8F, there may additionally be various embodiments in which a plurality of 3D objects are arranged with an arrangement attribute corresponding to an input attribute according to a user input.

In an embodiment, the object management module 340 of the electronic device 300 may provide information of arranging the plurality of 3D objects with an arrangement attribute (e.g., an arrangement interval, a rotation angle, an arrangement size, etc. of a 3D object) corresponding to an input attribute (e.g., an input speed) according to a user input. For example, when a user input speed (e.g., a movement speed of a second input) is fast, the object management module 340 may provide information of arranging the 3D objects at narrow intervals. For another example, when a user input speed (e.g., a movement speed of the second input) is fast, the object management module 340 may provide information of increasing the rotation angle of the 3D object and arranging the 3D object. Also, when the user input speed (e.g., the movement speed of the second input) is fast, the object management module 340 may provide information of increasing a difference of arrangement sizes of 3D objects and arranging the 3D objects. The object management module 340 may provide various types of information according to a setting, without being limited to the above-described embodiments in information on a relationship between the user input attribute (e.g., the input speed) and the arrangement attribute.

In an embodiment, the object management module 340 of the electronic device 300 may provide information of arranging a plurality of 3D objects with an arrangement attribute (e.g., an arrangement interval, a rotation angle, an arrangement size, etc. of a 3D object) corresponding to an input attribute (e.g., an input pressure) according to a user input. For example, when a user input pressure (e.g., an intensity of the second input) is large, the object management module 340 may provide information of arranging the 3D objects at narrow intervals. For another example, when the user input pressure (e.g., the intensity of the second input) is large, the object management module 340 may provide information of increasing the rotation angle of the 3D object and arranging the 3D object. Also, when the user input pressure (e.g., the intensity of the second input) is large, the object management module 340 may provide information of increasing a difference of arrangement sizes of 3D objects and arranging the 3D objects. The object management module 340 may provide various types of information according to a setting, without being limited to the above-described embodiments in information on a relationship between the user input attribute (e.g., the input pressure) and the arrangement attribute.

In an embodiment, the object management module 340 of the electronic device 300 may provide information of arranging a plurality of 3D objects with an arrangement attribute (e.g., an arrangement interval, a rotation angle, and an arrangement size, etc. of the 3D object) corresponding to an input attribute (e.g., an input time) according to a user input. For example, when a user input time (e.g., a time for a user's second input) is long, the object management module 340 may provide information of arranging 3D objects at narrow intervals. For another example, when the user input time (e.g., the time for the user's second input) is long, the object management module 340 may provide information of decreasing a rotation angle of a 3D object and arranging the 3D object. Also, when the user input time (e.g., the time for the user's second input) is long, the object management module 340 may provide information of decreasing a difference of arrangement sizes of 3D objects and arranging the 3D objects. The object management module 340 may provide various types of information according to a setting, without being limited to the above-described embodiments in information on a relationship between a user input attribute (e.g., an input time) and an arrangement attribute corresponding to the input attribute.

Figure 9:
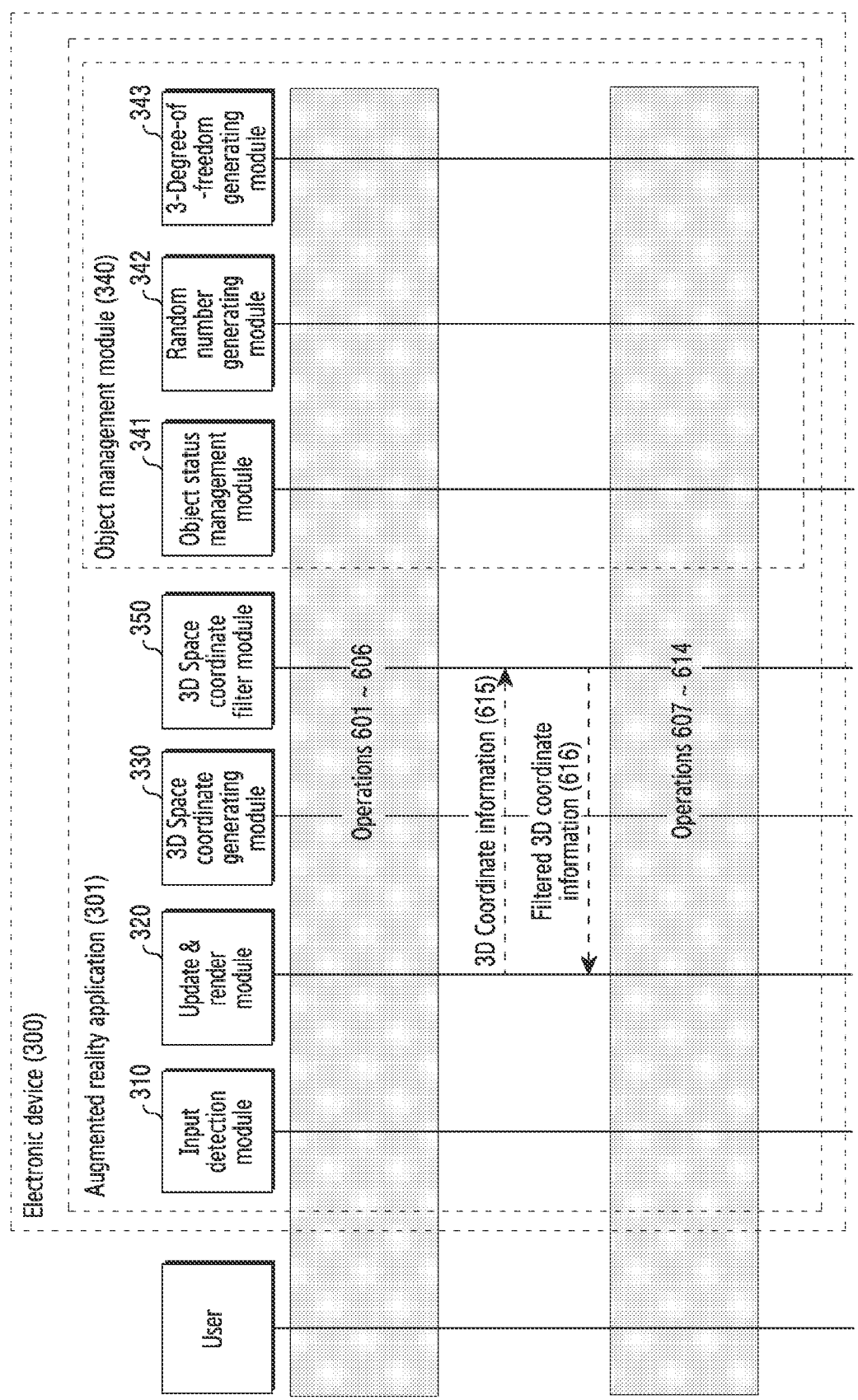
FIG. 9 is a diagram illustrating an overall flow in which an application of an example electronic device is operated when a 3D space coordinate filter is applied according to various embodiments.

FIG. 9 illustrates an overall flow in which an application of an example electronic device is operated when a 3D space coordinate filter is applied according to various embodiments. When the 3D space coordinate filter is applied, the electronic device 300 may additionally perform operations 615 to 616 between operations 601 to 606 and operations 607 to 614 described above.

In operation 615, the update & render module 320 of the electronic device 300 may deliver 3D space coordinate information to the 3D space coordinate filter module 350 in order to determine whether to remove noise included in the 3D space coordinate information or to ignore a user input. Also, the update & render module 320 may deliver the type of input to the 3D space coordinate filter module 350 in order to perform accurate filtering.

In an embodiment, the update & render module 320 may selectively perform an operation of delivering the 3D space coordinate information to the 3D space coordinate filter module 350. For example, when the 3D space coordinate filter is not applied, the electronic device 300 may perform operations 601 to 614, and when the 3D space coordinate filter is applied, the electronic device 300 may additionally perform operations 615 to 616 between operations 601 to 606 and operations 607 to 614.

According to an embodiment, in operation 616, the 3D space coordinate filter module 350 of the electronic device 300 may correct (or filter) current 3D space coordinate information, based on the received 3D space coordinate information. For example, there may be cases in which hand shake occurs during a user input process and thus an input occurs in an unwanted position, or coordinates inputted by a user are too close to previous touch coordinates. The 3D space coordinate filter module 350 may filter newly received 3D space coordinate information by comparing the newly received 3D space coordinate information with stored 3D space coordinate information, and deliver the filtered 3D space coordinate information to the update & render module 320. Also, the 3D space coordinate filter module 350 may store the filtered 3D space coordinate information.

In an embodiment, the 3D space coordinate filter module 350 may deliver information of ignoring 3D space coordinates themselves to the update & render module 320, and the 3D space coordinate filter module 350 may also deliver information of not performing a subsequent operation to the update & render module 320.

Figure 10A:
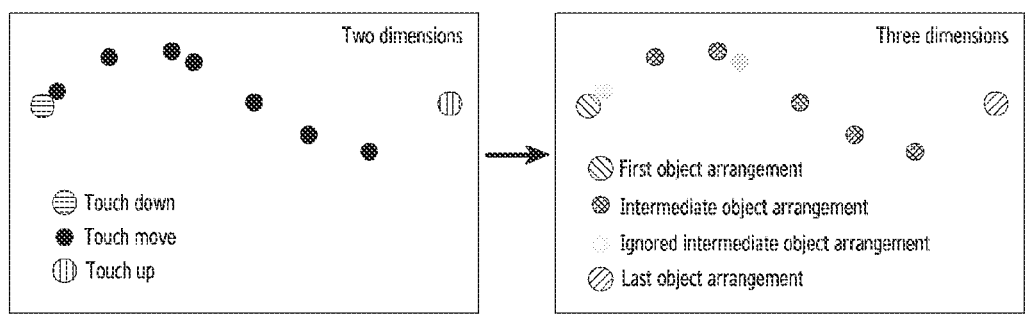
FIG. 10A is a diagram illustrating an example process of arranging a plurality of 3D objects when applying a 3D space coordinate filter according to various embodiments.

FIG. 10A illustrates an example process of arranging a plurality of 3D objects when applying a 3D space coordinate filter according to various embodiments. For example, a distance between user inputs may be quite narrow, and when the inputs are used for object arrangement as they are, objects may be unintentionally arranged close together. The 3D space coordinate filter module 350 may determine a distance between 3D space coordinates that are transformed based on 2D coordinates. Also, the 3D space coordinate filter module 350 may ignore the 3D space coordinates when a distance between the 3D space coordinates and previous 3D space coordinates is lower than a set value. The electronic device 300 may not perform operations 607 to 614 for the ignored 3D space coordinates. When the 3D space coordinates are ignored and operations 607 to 614 are not performed, the electronic device 300 may arrange 3D objects on a 3D space in a state (e.g., ignored intermediate object arrangement) of ignoring some of objects as shown in FIG. 10A.

Figure 10B:
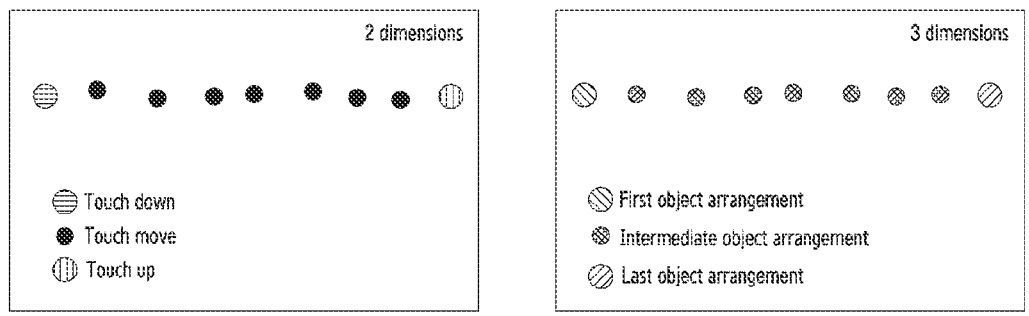
FIG. 10B is a diagram illustrating an example process of arranging a plurality of 3D objects when applying a 3D space coordinate filter according to various embodiments.

FIG. 10B illustrates an example process of arranging a plurality of 3D objects when applying a 3D space coordinate filter according to various embodiments. For example, the electronic device 300 may filter out a predetermined amount of hand shake that may occur in a direction different from a progress direction (e.g., the movement of a second input) of an input actually intended by the user, based on a biquad filter. In a specific example, as shown in FIG. 10B, there may be a case in which, although a user has inputted (e.g., the movement of a second input) with the intention of making a straight 2D input, the user fails to draw a straight line, which is different from the user's intention. The 3D space coordinate filter module 350 may correct (or filter) current 3D space coordinate information wherein a user's 2D input becomes a straight trajectory, based on the received 3D space coordinate information.

Figure 10C:
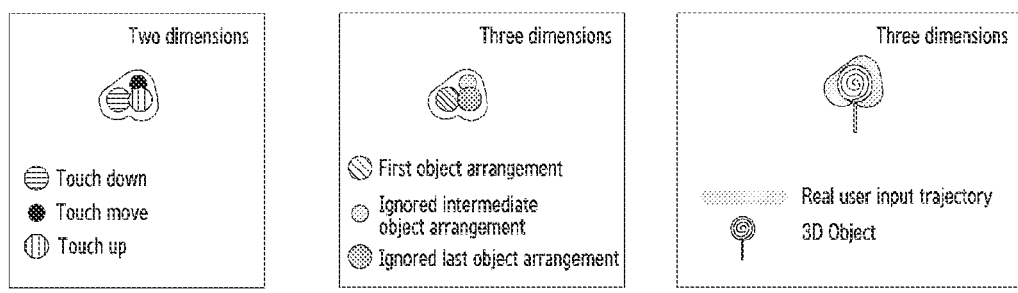
FIG. 10C is a diagram illustrating an example process of arranging one 3D object when applying a 3D space coordinate filter according to various embodiments.

FIG. 10C illustrates an example process of arranging one 3D object when applying a 3D space coordinate filter according to various embodiments. To provide a single object, a user may simply input a second input and an input of terminating the second input without moving the second input, to a screen. For example, the user may touch a display (e.g., the display 220) once with a finger or a stylus pen and then lift the finger or stylus pen. In this case, the input detection module 310 may divide a user input into subdivided inputs such as a touch down, a touch move, and a touch up as shown in FIG. 10C. Or, the input detection module 310 may divide into two inputs such as the touch down and the touch up in which the touch move is omitted. As described above, the 3D space coordinate filter module 350 may ignore when object arrangement is not made for 3D space coordinates corresponding to 2D coordinates provided in a short distance. The electronic device 300 may arrange one 3D object as shown in FIG. 10C.

Figure 11:
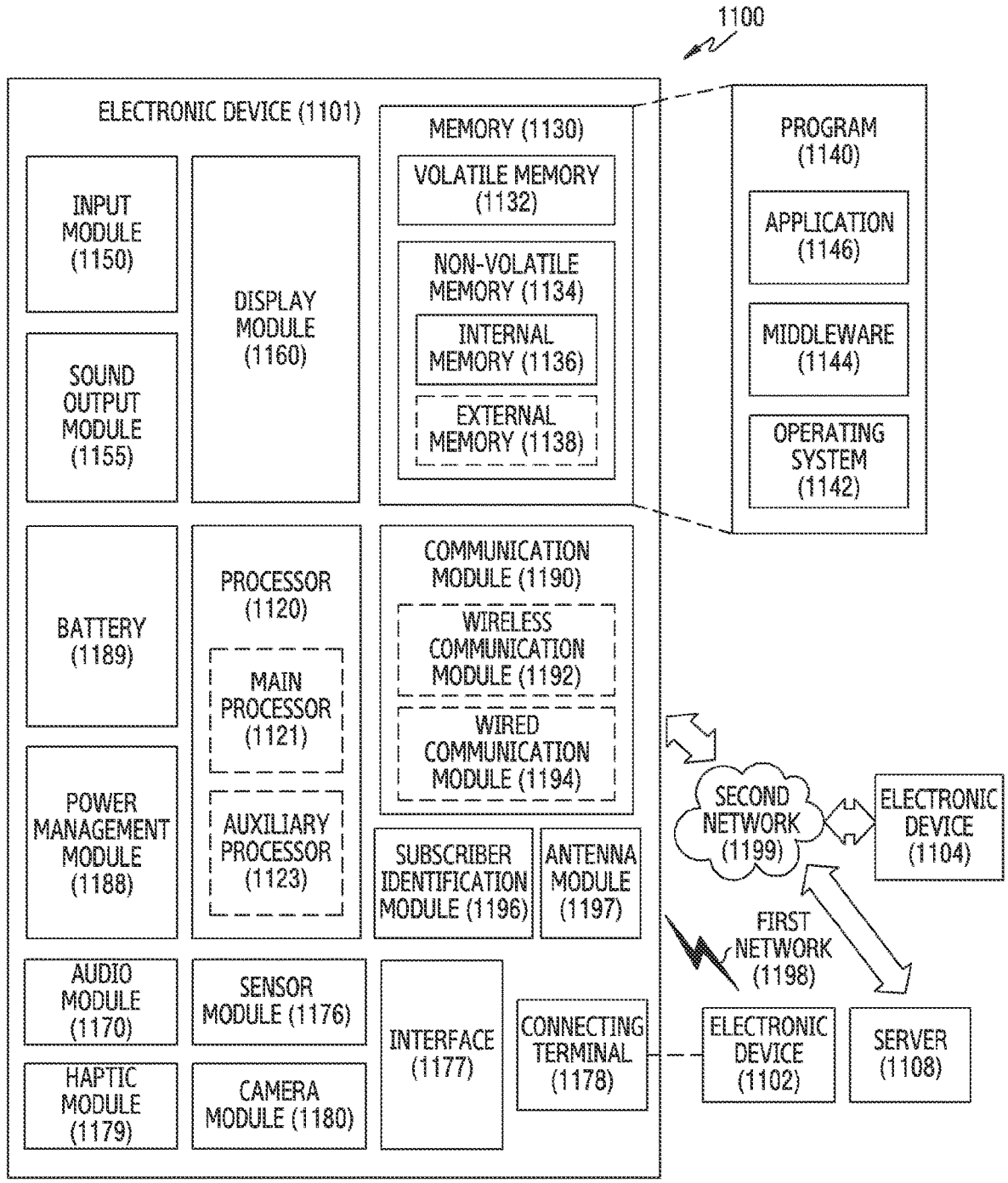
FIG. 11 is a block diagram of an example electronic device 1101 in a network environment 1100 according to various embodiments.

FIG. 11 is a block diagram illustrating an electronic device 1101 in a network environment 1100 according to various embodiments.

Referring to FIG. 11, the electronic device 1101 in the network environment 1100 may communicate with an electronic device 1102 via a first network 1198 (e.g., a short-range wireless communication network), or an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input module 1150, a sound output module 1155, a display module 1160, an audio module 1170, a sensor module 1176, an interface 1177, a connecting terminal 178, a haptic module 1179, a camera module 1180, a power management module 1188, a battery 1189, a communication module 1190, a subscriber identification module (SIM) 1196, or an antenna module 1197. In various embodiments, at least one (e.g., the display device 1160 or the camera module 1180) of the components may be omitted from the electronic device 1101, or one or more other components may be added in the electronic device 1101. In various embodiments, some of the components may be implemented as single integrated circuitry. For example, the sensor module 1176 (e.g., a fingerprint sensor, an iris sensor, or an illuminance sensor) may be implemented as embedded in the display device 1160 (e.g., a display).

The processor 1120 may execute, for example, software (e.g., a program 1140) to control at least one other component (e.g., a hardware or software component) of the electronic device 1101 coupled with the processor 1120, and may perform various data processing or computation. According to an embodiment, as at least part of the data processing or computation, the processor 1120 may load a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), and an auxiliary processor 1123 (e.g., a graphics processing unit (GPU), an image signal processor (ISP), a sensor hub processor, or a communication processor (CP)) that is operable independently from, or in conjunction with, the main processor 1121. Additionally or alternatively, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display device 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input module 1150 may receive a command or data to be used by other components (e.g., the processor 1120) of the electronic device 1101, from the outside (e.g., a user) of the electronic device 1101. The input module 1150 may include, for example, a microphone, a mouse, a keyboard, or a digital pen (e.g., a stylus pen).

The sound output module 1155 may output sound signals to the outside of the electronic device 1101. The sound output module 1155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display module 1160 may visually provide information to the outside (e.g., a user) of the electronic device 1101. The display module 1160 may include, for example, a display, a hologram device, or a projector and control circuitry to control a corresponding one of the display, hologram device, and projector. According to an embodiment, the display module 1160 may include touch circuitry adapted to detect a touch, or sensor circuitry (e.g., a pressure sensor) adapted to measure the intensity of force incurred by the touch.

The audio module 1170 may convert a sound into an electrical signal and vice versa. According to an embodiment, the audio module 1170 may obtain the sound via the input device 1150, or output the sound via the sound output device 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to an embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The antenna module 1197 may transmit or receive a signal or power to or from the outside (e.g., the external electronic device) of the electronic device 1101. According to an embodiment, the antenna module 1197 may include an antenna including a radiating element including a conductive material or a conductive pattern formed in or on a substrate (e.g., PCB). According to an embodiment, the antenna module 1197 may include a plurality of antennas. In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 and 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" storage medium refers, for example, to a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a display;
   at least one sensor;
   at least one camera;
   at least one processor; and
   memory storing instructions that, when executed by the at least one processor, cause the electronic device to:
   execute an augmented reality (AR) application,
   obtain image data of surroundings of the electronic device using the at least one camera,
   provide a 3D space coordinate system, based on the obtained image data,
   obtain a first input of selecting a 3D object,
   obtain a second input of selecting a first point on the display,
   map the first point to first coordinates of the 3D space coordinate system,
   provide a 3D path connecting from the first coordinates of the 3D space coordinate system to second coordinates of the 3D space coordinate system, based on movement of the electronic device detected by the at least one sensor and movement of the second input on the display, and
   display a plurality of the 3D objects respectively disposed at different coordinates on the 3D path simultaneously.

2. The electronic device of claim 1, wherein the instructions, when executed by the at least one processor, cause the electronic device to update the first coordinates and the second coordinates based on corrected 3D space coordinate information.

3. The electronic device of claim 1, wherein the instructions, when executed by the at least one processor, cause the electronic device to estimate 6-degree-of-freedom information in the 3D space coordinate system of the electronic device, based on the image data.

4. The electronic device of claim 1, wherein the instructions, when executed by the at least one processor, cause the electronic device to determine an object status, based on the movement of the electronic device and the movement of the second input on the display.

5. The electronic device of claim 1, wherein the instructions, when executed by the at least one processor, cause the electronic device to determine a type, rotation, and size of the 3D object to be displayed, based on an object setting.

6. The electronic device of claim 5,
   wherein the object setting comprises a setting stored in the memory and a user-defined setting.

7. The electronic device of claim 1, wherein the instructions, when executed by the at least one processor, cause the electronic device to display the 3D object at the coordinates on the 3D path, based on a random value.

8. The electronic device of claim 1, wherein the instructions, when executed by the at least one processor, cause the electronic device to display the 3D objects at the coordinates on the 3D path, based on the second input and an input attribute related to the movement of the second input.

9. The electronic device of claim 8, wherein the input attribute comprises at least one of a trajectory, a progress direction, an expected display position, a speed, a pressure, or a time.

10. The electronic device of claim 1, wherein the instructions, when executed by the at least one processor, cause the electronic device to display the 3D objects at the coordinates on the 3D path, based on an arrangement attribute corresponding to an input attribute.

11. A method of operating an electronic device, comprising:
    executing an augmented reality (AR) application;
    obtaining image data of surroundings of the electronic device;
    providing a 3D space coordinate system, based on the obtained image data;
    obtaining a first input of selecting a 3D object;
    obtaining a second input of selecting a first point on a display;
    mapping the first point to first coordinates of the 3D space coordinate system;
    providing a 3D path connecting from the first coordinates of the 3D space coordinate system to second coordinates of the 3D space coordinate system, based on movement of the electronic device detected by at least one sensor and movement of the second input on the display; and
    displaying a plurality of the 3D objects respectively disposed at different coordinates on the 3D path simultaneously.

12. The method of claim 11, wherein the first coordinates and the second coordinates are updated based on corrected 3D space coordinate information.

13. The method of claim 11, further comprising estimating 6-degree-of-freedom information in the 3D space coordinate system of the electronic device, based on the image data.

14. The method of claim 11, further comprising determining an object status, based on the movement of the electronic device and the movement of the second input on the display.

15. The method of claim 11, further comprising determining a type, rotation, and size of the 3D object to be displayed, based on an object setting.

16. A non-transitory computer-readable storage medium storing instructions which, when executed by at least one processor of an electronic device, cause the at least one processor to control the electronic device to:
    execute an augmented reality (AR) application;
    obtain image data of surroundings of the electronic device;
    provide a 3D space coordinate system, based on the obtained image data;

obtain a first input of selecting a 3D object;
obtain a second input of selecting a first point on a display;
map the first point to first coordinates of the 3D space coordinate system;
provide a 3D path connecting from the first coordinates of the 3D space coordinate system to second coordinates of the 3D space coordinate system, based on movement of the electronic device detected by at least one sensor and movement of the second input on the display; and
display a plurality of the 3D objects respectively disposed at different coordinates on the 3D path simultaneously.

17. An electronic device comprising the non-transitory computer-readable storage medium of claim 16.

* * * * *